(12) United States Patent
Scherzer et al.

(10) Patent No.: US 6,191,179 B1
(45) Date of Patent: Feb. 20, 2001

(54) PREPARATION OF POLYURETHANE FOAMS

(75) Inventors: Dietrich Scherzer, Neustadt; Ulrich Treuling, Bensheim; Klaus Wagner, Hessheim; Rolf Illguth, Ludwigshafen; Sarbananda Chakrabarti, Mannheim, all of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/271,233

(22) Filed: Mar. 17, 1999

(30) Foreign Application Priority Data

Mar. 25, 1998 (DE) .............................. 198 13 107

(51) Int. Cl.$^7$ .................................... C08G 18/20
(52) U.S. Cl. .......................... 521/114; 521/128; 521/129; 521/174
(58) Field of Search .................................. 521/114, 128, 521/129, 174

(56) References Cited

U.S. PATENT DOCUMENTS

| | | |
|---|---|---|
| 3,281,378 | 10/1966 | Garber et al. . |
| 4,018,636 | 4/1977 | O'Neill et al. . |
| 4,194,069 * | 3/1980 | Speranza . |
| 4,263,070 | 4/1981 | Price et al. . |
| 4,482,499 | 11/1984 | Merger et al. . |
| 4,497,963 | 2/1985 | Merger et al. . |
| 4,530,796 | 7/1985 | Mattner et al. . |
| 4,713,476 | 12/1987 | Merger et al. . |
| 4,772,639 | 9/1988 | Pilger et al. . |
| 4,851,565 | 7/1989 | Merger et al. . |
| 5,087,739 | 2/1992 | Bohmholdt et al. . |
| 5,284,969 | 2/1994 | Hauner et al. . |
| 5,315,034 | 5/1994 | Mizia et al. . |
| 5,360,931 | 11/1994 | Bohmholdt et al. . |
| 5,386,053 | 1/1995 | Otterbach . |
| 5,616,784 | 4/1997 | Schwarz et al. . |
| 5,731,458 | 3/1998 | Dahmer et al. . |
| 5,814,676 * | 9/1998 | Jacobs et al. . |
| 5,883,291 | 3/1999 | Schleenstein et al. . |

FOREIGN PATENT DOCUMENTS

| | | |
|---|---|---|
| 0 018 586 B1 | 11/1980 | (EP) . |
| 0 018 588 B1 | 11/1980 | (EP) . |
| 0 078 005 A1 | 5/1983 | (EP) . |
| 0 143 320 A2 | 6/1985 | (EP) . |
| 0 275 010 A2 | 7/1988 | (EP) . |
| 0 355 443 B1 | 2/1990 | (EP) . |
| 0 524 554 B1 | 1/1993 | (EP) . |
| 0 542 106 B1 | 5/1993 | (EP) . |
| 0 566 925 B1 | 10/1993 | (EP) . |
| 0 568 782 B1 | 11/1993 | (EP) . |
| 0 570 071 A1 | 11/1993 | (EP) . |
| 0 609 786 A1 | 8/1994 | (EP) . |
| 0 568 782 B1 | 5/1996 | (EP) . |
| 0 795 543 A1 | 9/1997 | (EP) . |
| 0 795 544 A1 | 9/1997 | (EP) . |
| 1368327 | 9/1974 | (WO) . |
| 1406127 | 9/1975 | (WO) . |

* cited by examiner

*Primary Examiner*—John M. Cooney, Jr.
(74) *Attorney, Agent, or Firm*—Fernando A. Borrego

(57) ABSTRACT

A process for the preparation of foamed plastics materials based on polyisocyanate polyaddition products by the reaction of isocyanates with isocyanate-reactive compounds in the presence of catalysts and, optionally, auxiliaries and/or additives, wherein i) isocyanates having isocyanurate and/or biuret structures are used, the isocyanate-reactive compounds used are
ii) at least one diol and/or polyol having a molecular weight of from 400 to 8000 and containing at least 50% of primary hydroxyl groups based on all of the hydroxyl groups present in the compound,
iii) at least one compound having at least one primary amine group, and diols and/or triols having molecular weights of less than 400 are optionally used as chain-extending and/or crosslinking agents, the reaction being carried out in the presence of
iv) at least one tertiary amine acting as catalyst and/or
v) at least one metal salt acting as catalyst and
vi) water.

8 Claims, No Drawings

PREPARATION OF POLYURETHANE FOAMS

DESCRIPTION

The invention relates to processes for the preparation of foamed plastics based on polyisocyanate polyaddition products by the reaction of isocyanates with isocyanate-reactive compounds having a molecular weight of from 400 to 8000 in the presence of expanding agents, catalysts and optionally chain-extending and/or crosslinking agents having a molecular weight of less than 400, auxiliaries and/or additives, and to foamed plastics based on polyisocyanate polyaddition products which can be produced by this process.

The preparation of foamed plastics based on polyisocyanate polyaddition products, usually polyurethane products and, optionally, polyisocyanura products, by the reaction of isocyanates with isocyanate-reactive compounds in the presence of expanding agents, catalysts and optionally auxiliaries and/or additives has been described in many places. Usually aromatic diisocyanates are used for the preparation of foamed plastics based on polyisocyanate polyaddition products, which aromatic diisocyanates are caused to react with suitable isocyanate-reactive compounds. A drawback occurring in foams prepared in such a manner comprises their tendency to become discolored when exposed to light or when stored and, in the case of some applications, their hydrophobic nature.

Light-fast foamed plastics are usually prepared on the basis of aromatic isocyanates and UV stabilizers. A disadvantage of this is that these UV stabilizers are extremely expensive and are active only for a restricted period. Foamed plastics prepared from aliphatic isocyanates known hitherto are suitable for only very specific applications. WO 89/05830 describes polyurethane networks prepared from polyesterols and lysine diisocyanate. The preparation of such polyurethanes is elaborate however, and impossible for some applications. Polyurethanes based on aliphatic isocyanates are also described in U.S. Pat. No. 4,018,636, U.S. Pat. No. 4,263,070 and U.S. Pat. No. 3,281,378, but these specifications contain no useful teaching on the preparation of expanded polyurethanes.

Optionally expanded polyurethanes based on aliphatic isocyanates are described in EP-A 210,566 and EP-A 275,010. A drawback involved in this technological teaching is the high content of volatile monomeric aliphatic isocyanates (EP-A 275,010) and, respectively, the low content of isocyanate groups (EP-A 210,566) required for the expanding reaction with water.

It is an object of the present invention to provide a process for the preparation of foamed plastics based on polyisocyanate polyaddition products by the reaction of isocyanates with isocyanate-reactive compounds in the presence of expanding agents and catalysts and optionally auxiliaries and/or additives, by means of which foamed plastics can be produced which are not susceptible to discoloration even when stored for relatively long periods under UV irradiation and have a more hydrophilic nature than the foams based on aromatic isocyanates known in the prior art.

This object is achieved in the present invention by the following measures:

i) isocyanates having isocyanurate and/or biuret structures are used, the isocyanate-reactive compounds used are ii) at least one diol and/or polyol having a molecular weight of from 400 to 8000 and containing at least 50% of primary hydroxyl groups based on all of the hydroxyl groups present in the compound, iii) at least one compound having at least one primary amine group, and diols and/or triols having molecular weights of less than 400 are optionally used as chain-extending and/or crosslinking agents, the reaction being carried out in the presence of iv) at least one tertiary amine acting as catalyst and/or v) at least one metal salt acting as catalyst and vi) water.

Suitable isocyanates (i) having isocyanurate and/or biuret structures are the aliphatic and/or cycloaliphatic diisocyanates that are known per se which may have been biuretized and/or cyanuratized by generally known processes and exhibit at least one, and preferably at least two, free isocyanate groups and more preferably exhibit three free isocyanate groups. This trimerization trebles the molecular weight of the aliphatic isocyanates and raises their functionality.

The following may be mentioned as specific examples: alkylene diisocyanates containing from 4 to 12 carbon atoms in the alkylene radical such as dodecane-1,12-diisocyanate, 2-ethyltetramethylene-1,4-diisocyanate, 2-methylpentamethylene-1,5-diisocyanate, tetramethylene-1,4-diisocyanate, lysine ester diisocyanates (LDI) and/or hexamethylene-1,6-diisocyanate (HDI); cycloaliphatic diisocyanates such as cyclohexane-[1,3 and 1,4]-diisocyanates and also arbitrary mixtures of these isomers, hexahydrotoluylene-[2,4 and 2,6]-diisocyanates and the corresponding isomer mixtures, dicyclohexylmethane-[4,4', 2,2' and 2,4']-diisocyanates and the corresponding isomer mixtures and/or 1-isocyanato-3,3,5-trimethyl-5-isocyanatomethylcyclohexane (IPDI).

The component (i) used is preferably isocyanuratized and/or biuretized hexamethylene-1,6-diisocyanate, 1-isocyanato-3,3,5-trimethyl-5-isocyanatomethylcyclohexane and/or lysine ester diisocyanate.

The trimerization of isocyanates for the preparation of isocyanates having an isocyanurate structure can be carried out at usual temperatures in the presence of known catalysts, eg phosphines and/or phospholine derivatives, amines, alkali metal salts, metal compounds and/or Mannich bases. Trimerized isocyanates containing isocyanurate structures are, moreover, commercially available.

Isocyanates having biuret structures can be prepared by generally known processes eg by reaction of the said diisocyanates with water or eg diamines, a urea derivative being formed as intermediate. Biuretized isocyanates are also commercially available.

Isocyanates having isocyanurate and/or biuret structures can be used in the process of the invention together with other isocyanates, preferably organic diisocyanates. Suitable other isocyanates are the aforementioned aliphatic and cycloaliphatic diisocyanates and also aromatic diisocycanates and aromatic polyisocyanates such as toluylene-[2,4 and 2,6]-diisocyanate and the corresponding isomer mixtures, diphenylmethane-[4,4', 2,4' and 2,2']-diisocyanates and the corresponding isomer mixtures, mixtures of diphenylmethane-[4,4' and 2,2']-diisocyanates, polyphenyl-polymethylene polyisocyanates, mixtures of diphenylmethane-[4,4', 2,4' and 2,2']-diisocyanates and polyphenyl-polymethylene polyisocyanates (crude MDI) and mixtures of crude MDI and toluylene-diisocyanates. Di- and/or poly-isocyanates containing ester, urea, allophanate, carbodiimide, uretdione and/or urethane groups can be used in the process of the invention in addition to the isocyanates having isocyanurate and/or biuret structures as proposed in the invention. Specific examples thereof are urethane group-containing organic polyisocyanates having NCO contents of from 33.6 to 15 wt %, preferably from 31 to 21 wt %, based on the total weight, eg with low-molecular diols, triols, dialkylene glycols, trialkylene glycols or polyether polyalcohols having molecular weights of up to 6000, particularly molecular weights of up to 1500, modified diphenylmethane-4,4'-diisocyanate, modified mixtures of diphenylmethane-[4,4' and 2,4']-diisocyanates, modified crude MDI or toluylene-[2,4 or 2,6]-diisocyanate, where the di- or poly-(oxyalkylene glycol)s, which may be used individually or as mixtures, are eg diethylene glycol, dipropylene glycol, polyoxyethylene glycol, polyoxypropylene glycol and polyoxypropylene polyoxyethylene glycol, and the corresponding triols and/or tetrols. Also suitable are NCO group-containing prepolymers having NCO contents of from 25 to 3.5 wt %, preferably from 21 to 14 wt %, based on the total weight, prepared from the polyester polyalcohol and/or, preferably, polyether polyalcohols and diphenylmethane-4,4'-diisocyanate, mixtures of diphenylmethane-[2,4' and 4,4']-diisocyanates, toluylene-[2,4 and/or 2,6]-diisocyanates or crude MDI as described below. Liquid, carbodiimide group-containing polyisocyanates having NCO contents of from 33.6 to 15, preferably from 31 to 21 wt %, based on the total weight, based on eg diphenylmethane-[4,4', 2,4' and/or 2,2']-diisocyanates and/or toluylene-[2,4 and/or 2,6]-diisocyanate have also been found to be useful. The modified polyisocyanates can be optionally mixed with each other or with unmodified organic polyisocyanates such as diphenylmethane-[2,4' and 4,4']-diisocyanates, crude MDI and toluylene-[2,4 and/or 2,6]-diisocyanate.

The isocyanates having isocyanurate and/or biuret structures are preferably used together with aliphatic and/or cycloaliphatic diisocyanates, where preferably from 50 to 100% of the NCO groups used in the process of the invention are provided by the isocyanates having isocyanurate and/or biuret structures. It is particularly preferred to use, in the process of the invention, isocyanates containing isocyanurate and/or biuret structures as the only compounds containing isocyanate groups.

The isocyanate-reactive compounds used in the present invention are the following components (ii) and (iii):
ii) at least one polyalcohol having a molecular weight of from 400 to 8000 and containing at least 50%, preferably at least 60% and more preferably from 80 to 100%, of primary hydroxyl groups based on all of the hydroxyl groups present in the compound,
iii) at least one compound having at least one primary amine group.
and, optionally, as further components, diols and/or triols having molecular weights of less than 400, acting as chain-extending and/or crosslinking agents.

The polyalcohols (ii) contain per definition no primary amine groups.

The following examples of polyalcohols listed below relate to polyalcohols of the invention (ii), if they exhibit at least 50% of primary hydroxyl groups, or otherwise to polyalcohols having a molecular weight of from 400 to 8000 which may optionally be used in addition to the polyalcohols proposed by the invention (ii).

The expression "all of the isocyanate-reactive compounds used" used below refers to the components of the invention (ii) and (iii) plus polyalcohols having a molecular weight of from 400 to 8000 optionally used in addition to component (ii) and optionally diols and/or triols having a molecular weight of less than 400.

The polyalcohols (ii) used are advantageously those having a functionality of from 2 to 8, preferably from 2 to 6, and a molecular weight of from 400 to 8000, preferably from 400 to 3000. The compounds used depend on the desired properties of the polyurethane foam to be synthesized. Successful use has been made of eg polyalcohols selected from the group comprising polyether polyalcohols, polyester polyalcohols, polythioether-polyalcohols, poly(oxymethylene)s containing hydroxyl groups and aliphatic polycarbonates containing hydroxyl groups or mixtures of at least two of the said polyalcohols. Polyester polyalcohols and/or polyether polyalcohols are preferably used. The hydroxyl value of the polyhydroxyl compounds is usually from 28 to 850 mg of KOH/g and preferably from 35 to 600 mg of KOH/g.

For rigid foams, the polyalcohol components used are preferably high-function polyalcohols, particularly polyether polyalcohols based on high-function alcohols, sugar alcohols and/or saccharides as primers, and for flexible foams di- and/or tri-functional polyether polyacohols and/or polyester polyalcohols based on glycerol and/or trimethylol propane and/or glycols are used as primers, ie the alcohols to be esterified.

The preparation of polyether polyalcohols can be carried out by known technology. Depending on the particular application, the necessary starting substances are mixed and alkaline catalyst, particularly alkali metal or alkaline earth metal hydroxide, is added, and the mixture is caused to react at elevated temperatures and pressures with alkylene oxides, particularly ethylene and/or propylene oxide. The resulting polyether polyalcohols have terminal ethylene oxide units for the generation of primary hydroxyl groups.

Following the synthesis, the catalyst is removed by neutralization with an acid, distillation and filtration. The acids used are primarily the two inorganic acids hydrochloric acid and/or orthophosphoric acid on account of the exact control of the equivalence point and the technologically simple removal of any excess acid.

The polyalcohols (ii) used are thus polyether polyalcohols, which can be prepared from one or more alkylene oxides containing from 2 to 4 carbon atoms in the alkylene radical by known methods, eg by anionic polymerization with alkali metal hydroxides such as sodium or potassium hydroxide or alkali metal alkoxides such as sodium methoxide, sodium or potassium ethoxide or potassium isopropylate, as catalysts and with the addition of at least one primer containing from 2 to 8, preferably from 2 to 6, reactive bonded hydrogen atoms, or by cationic polymerization with Lewis acids such as antimony pentachloride, boron fluoride etherate, or the like, or bleaching earth, acting as catalysts.

Examples of suitable alkylene oxides for the preparation of the polyalcohols are tetrahydrofuran, 1,3-propylene oxide, [1,2 or 2,3]-butylene oxide, styrene oxide and preferably ethylene oxide and 1,2-propylene oxide. The alkylene oxides can be used singly, consecutively, or as mixtures. It is preferred to use alkylene oxides which give primary hydroxyl groups in the polyalcohol. The polyalcohols used are very preferably those which at the conclusion of alkoxylation have been alkoxylated with ethylene oxide and thus possess primary hydroxyl groups.

Examples of suitable primers are water, organic dicarboxylic acids such as succinic acid, adipic acid, phthalic acid and terephthalic acid, aliphatic and aromatic, optionally N-monoalkyl-substituted, N,N-dialkyl-substituted and N,N'-dialkyl-substituted diamines containing from 1 to 4 carbon atoms in the alkyl group, such as optionally monoalkyl-substituted and dialkyl-substituted ethylene diamine, diethylene triamine, triethylene tetramine, 1,3-propylene diamine, [1,3 or 1,4]-butylene diamine, [1,2, 1,3, 1,4, 1,5 and 1,6]-hexamethylene diamines, phenylene diamines, [2,3, 2,4 and 2,6]-toluylene diamines and [4,4', 2,4' and 2,2']-diaminodiphenylmethanes.

Other suitable primers are alkanolamines such as ethanolamine, N-methyl and N-ethyl ethanolamines, dialkanolamines such as diethanolamine, N-methyl and N-ethyl diethanolamines and trialkanolamines such as triethanolamine, and ammonia. Polyhydric, particularly dihydric and trihydric alcohols such as ethanediol, propane-[1,2 and 1,3]-diols, diethylene glycol, dipropylene glycol, butane-1,4-diol, hexane-1,6-diol, glycerol, trimethylol propane, pentaerythritol, sorbitol and sucrose are preferably used.

The polyether polyalcohols possess a functionality preferably ranging from 2 to 6 and particularly from 2 to 4 and molecular weights preferably ranging from 400 to 3000 and preferably from 400 to 2000.

Other suitable polyether polyalcohols are polymer-modified polyether polyalcohols, preferably graft polyether polyalcohols, particularly those based on styrene and/or acrylonitrile, which are prepared by generally known methods by in situ polymerization of acrylonitrile, styrene or preferably mixtures of styrene and acrylonitrile, eg in a ratio, by weight, of from 90:10 to 10:90, preferably from 70:30 to 30:70, advantageously in the aforementioned polyether polyalcohols, and also polyether polyalcohol dispersions, which contain eg polyureas, polyhydrazides, polyurethanes containing bonded tert-amino groups and/or melamine, as disperse phase, usually in a quantity of from 1 to 50 wt %, preferably from 2 to 25 wt %.

Suitable polyester polyalcohols can be prepared eg from organic dicarboxylic acids containing from 2 to 12 carbon atoms, preferably aliphatic dicarboxylic acids containing from 4 to 6 carbon atoms and polyhydroxylic alcohols, preferably diols, containing from 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedioic acid, maleic acid, fumaric acid, phthalic acid, isophthalic acid and terephthalic acid. The dicarboxylic acids can be used individually or in the form of mixtures. Instead of the free dicarboxylic acids, it is possible to use corresponding dicarboxylic derivatives such as alkyl dicarbonates of alcohols containing from 1 to 4 carbon atoms or dicarboxylic anhydrides. It is preferred to use mixtures of dicarboxylic acids comprising succinic, glutaric and adipic acids in proportions of, say, 20–35:35–50:20–32 parts by weight, particularly adipic acid. Examples of dihydric and polyhydric alcohols, particularly diols are: ethane diol, diethylene glycol, propane-[1,2 or 1,3]-diol, dipropylene glycol, butane-1,4-diol, pentane-1,5-diol, hexane-1,6-diol, decane-1,10-diol, glycerol and trimethylol propane. It is preferred to use ethane diol, diethylene glycol, butane-1,4-diol, pentane-1,5-diol, hexane-1,6-diol or mixtures of at least two of the said diols, particularly mixtures of butane-1,4-diol, pentane-1,5-diol and hexane-1,6-diol. Use may also be made of polyester polyalcohols of lactones, eg ε-caprolactone or hydroxycarboxylic acids, eg ω-hydroxycaproic acid.

To prepare the polyester polyalcohols, the organic, for example aromatic and preferably aliphatic, polycarboxylic acids and/or derivatives thereof and polyhydric alcohols can be polycondensed in the absence of catalysts or, preferably, in the presence of esterification catalysts, advantageously in an atmosphere of inert gas such as nitrogen, carbon dioxide, helium, argon and the like, in the melt at temperatures of from 150° to 250° C., preferably from 180° to 250° C. optionally under reduced pressure, until the desired acid value is achieved, this being advantageously lower than 10, preferably lower than 2. In a preferred embodiment, the esterification mixture is polycondensed under standard pressure at the aforementioned temperatures, until an acid value of from 80 to 30, preferably from 40 to 30, is obtained, and then under a pressure of less than 500 mbar, preferably from 0 to 150 mbar. Suitable esterification catalysts are for example catalysts containing iron, cadmium, cobalt, lead, zinc, antimony, magnesium, titanium or tin in the form of metals, metal oxides or metal salts. Alternatively, however, the polycondensation can be carried out in the liquid phase in the presence of diluents and/or entraining agents such as benzene, toluene, xylene or chlorobenzene, to effect azeotropic removal of the water of condensation.

The preparation of polyester polyalcohols comprises polycondensation of organic polycarboxylic acids and/or derivatives thereof and polyhydroxylic alcohols advantageously in a molar ratio of from 1:1 to 1:1.8, preferably from 1:1.05 to 1:1.2.

The resulting polyester polyalcohols possess a functionality of, preferably, from 2 to 4 and more preferably from 2 to 3, and a molecular weight of from 480 to 3000 and preferably from 600 to 2000, more preferably from 600 to 1500.

Suitable poly(oxymethylene)s containing hydroxyl groups are for example the compounds obtainable from glycols such as diethylene glycol, triethylene glycol, 4,4'-dihydroxyethoxydiphenyldimethylmethane, hexane diol and formaldehyde. Suitable poly(oxymethylene)s can also be prepared by polymerization of cyclic acetals.

Suitable hydroxyl group-containing polycarbonates are those of the prior art, which may be prepared, for example, by reaction of diols such as propane-1,3-diol, butane-1,4-diol and/or hexane-1,6-diol, diethylene glycol, triethylene glycol or tetraethylene glycol with diaryl carbonates, eg diphenyl carbonate, or phosgene. The polyesteramides include, for example, the predominantly linear condensates formed from polybasic saturated and/or unsaturated carboxylic acids or their anhydrides and polyhydric saturated or unsaturated amino alcohols or mixtures of polyhydric alcohols and amino alcohols and/or polyamines.

Suitable polyether polyamines can be prepared from the aforementioned polyether polyalcohols by known methods. Examples of suitable methods are the known cyanoalkylation of polyoxyalkylene polyalcohols and subsequent hydrogenation of the resulting nitrile or the known partial or full-scale amination of polyoxyalkylene polyalcohols with amines or ammonia in the presence of hydrogen and catalysts.

Particularly preferred polyalcohols (ii) used are polyether polyalcohols, eg polytetrahydrofuran, polyether polyalcohols prepared by conventional techniques comprising the addition of alkylene oxides to primers, finalized with ethylene oxide, by which means the terminal ethylene oxide units generate the primary hydroxyl groups in the polyether polyalcohols, as required by the invention.

In addition to the polyalcohol (ii), there may be optionally used other conventional polyalcohols, ie compounds containing at least two hydroxyl groups and having molecular weights of from 400 to 8000 and which have less than 50% of primary hydroxyl groups based on all of the hydroxyl groups present in the compound. These optional polyalcohols additional to (ii) also have per definition no primary amine groups.

Preferably the polyalcohols of the invention (ii) plus the optional additional polyalcohols having a molecular weight of from 400 to 8000 have on the average at least 50% of primary hydroxyl groups, based on all of the hydroxyl groups present in these compounds.

The compounds (iii) of the invention exhibiting at least one primary amine group usually have molecular weights of from 50 to 2000, preferably from 60 to 500. The compounds (iii) have preferably at least 1 primary amine group and more preferably from 1 to 2 primary amine groups. If desired, the compounds (iii) can contain in addition to the primary amine groups other isocyanate-reactive groups, eg hydroxyl groups and/or secondary amine groups. Preferably however the compounds (iii) have exclusively primary amine groups as isocyanate-reactive groups. For example, the following compounds can be used as component (iii):

aliphatic, cycloaliphatic, araliphatic and/or aromatic monoamines and/or diamines such as butylamine, pentylamine, hexylamine, butylene diamine, hexamethylene diamine, cyclohexylamine, ethoxyalkylamines, methoxyalkylamines, N,N-dimethylpropylene diamine and/or benzylamine. It is preferred to use N,N-dimethylpropylene diamine and/or benzylamine.

Preferably the nitrogen content in (ii)), (iii) and optionally diols or triols having molecular weights of less than 400 is from 2 to 8 wt % and more preferably from 3 to 6 wt %, based on the weight of (ii), (iii) and optionally diols and/or triols having molecular weights of less than 400.

As isocyanate-reactive compounds optionally diols and/or triols having molecular weights of less than 400 can be used as chain-extending and/or crosslinking agents in the process of the invention. For modification of the mechanical properties, eg the hardness, the addition of chain-extenders, cross-linking agents or optionally mixtures thereof can however prove to be advantageous. The chain extending and/or crosslinking agents have preferably a molecular weight of from 60 to 300. Examples of suitable primers are aliphatic, cycloaliphatic and/or araliphatic diols containing from 2 to 14, preferably from 4 to 10, carbon atoms such as ethylene glycol, propane-1,3-diol, decane-1,10-diol, o-, m- and p-dihydroxycyclohexanes, diethylene glycol, dipropylene glycol and preferably butane-1,4-diol, hexane-1,6-diol and bis(2-hydroxyethyl)hydroquinone, triols such as [1,2,4 and 1,3,5 ]-trihydroxycyclohexanes, glycerol and trimethylol propane and low-molecular polyalkylene oxides containing hydroxyl groups based on ethylene and/or 1,2-propylene oxide and the aforementioned diols and/or triols.

If chain-extenders, cross-linking agents or mixtures thereof are used for the preparation of the polyurethane foams, they are advantageously used in a concentration of from 0 to 20 wt %, preferably from 2 to 8 wt %, based on the weight of all of the isocyanate-reactive compounds used.

The expanding agent used for the preparation of the polyurethane foams in the present invention is water, which reacts with isocyanate groups with the formation of carbon dioxide and is preferably used in a concentration of from 0.5 to 10 wt % of water and more preferably in a concentration of from 0.6 to 7 wt % of water, based, in each case, on the weight of all of the isocyanate-reactive compounds used. In addition to water, preferably other conventional expanding agents and more preferably physically effective expanding agents, can be used. Suitable are optionally modified polyisocyanates as such physically effective expanding agents liquids which are inert to the organic, optionally modified polyisocyanates and have boiling points below 100° C., preferably below 50° C., particularly between −50° C. and +30° C. at ambient pressure, such that they evaporate under the influence the exothermic polyaddition reaction. Examples of such preferably used liquids are alkanes such as heptane, hexane, n- and iso-pentanes and more preferably industrial mixtures of n- and iso-pentanes, n- and iso-butanes and propane, cycloalkanes such as cyclopentane and/or cyclohexane, ethers such as furan, dimethyl ethers and diethyl ethers, ketones such as acetone and methyl ethyl ketone, alkyl carbonates such as methyl formate, dimethyl oxalate and ethyl acetate and halogenated hydrocarbons such as conventional fluorocarbons and/ or chlorinated hydrocarbons such as methylene chloride. In addition, mixtures of these low-boiling liquids with each other and/or with other substituted or unsubstituted hydrocarbons can be used. Also suitable are organic carboxylic acids such as formic acid, acetic acid, oxalic acid, ricinoleic acid and carboxyl group-containing compounds. The expanding agents are usually added to the components (ii) and/or (iii). They can, however, be added to the isocyanate component or to a combination of the polyalcohol component and the isocyanate component or to premixes of these components with the remaining constituents. The quantity used of the physically active expanding agent is preferably from 0.5 to 25 wt % and more preferably from 3 to 15 wt %, based, in each case, on the weight of all of the isocyanate-reactive compounds used. The water used as expanding agent is preferably added to the polyalcohol component.

The catalysts used for the preparation of the polyurethane foams are at least one tertiary amine (iv) and/or at least one metal salt (v), preferably at least one tertiary amine (iv) and at least one metal salt (v) which considerably accelerate the reaction of isocyanates with the isocyanate-reactive compounds, the preferred total catalyst concentration being from 0.001 to 15 wt % and, in particular, from 0.05 to 6 wt %, based on the weight of all of the isocyanate-reactive compounds used. Preferably from 0.1 to 8 wt % of at least one tertiary amine and/or (preferably and) from 0.01 to 3 wt % of at least one metal salt are used, where the percentages by weight are based on the weight of all of the isocyanate-reactive compounds used.

As tertiary amines (iv) use can be made of eg triethylamine, tributylamine, dimethylbenzylamine, dicyclohexylmethylamine, dimethylcyclohexylamine, N,N,N',N'-tetramethyidiaminodiethyl ether, bis (dimethylaminopropyl)urea, N-methyl- or N-ethyl-morpholine, N-cyclohexylmorpholine, N,N,N',N'-tetramethylethylene diamine, N,N,N',N'-tetramethylbutane diamine, N,N,N',N'-tetramethylhexane-1,6-diamine, pentamethyldiethylene triamine, dimethylpiperazine, N-dimethylaminoethylpiperidine, 1,2-dimethylimidazol, 1-azabicyclo-(2,2,0)-octane, 1,4-diazabicyclo-(2,2,2)-octane (Dabco) and alkanolamine compounds such as triethanolamine, triisopropanolamine, N-methyl and N-ethyl diethanolamines, dimethylaminoethanol, 2-(N,N-dimethylaminoethoxy)ethanol, N,N',N"-tris-(dialkylaminoalkyl)hexahydrotriazines, eg N,N',N"-tris (dimethylaminopropyl)-s-hexahydrotriazine, can be used. The components (iv) used are preferably triethylene diamine, pentamethylenediethylene triamine and/or bis (dimethylamino)ether.

As metal salts (v) there can be used eg inorganic and/or organic compounds of iron, lead, zinc, and/or tin in usual oxidation states of the metal, eg iron(II) chloride, zinc chloride, lead octoate and preferably tin salts such as tin dioctoate, diethyltin hexoate, dibutyltin dilaurate and/or dibutyidilauryltin mercaptide. Particularly preferred examples of (v) are dibutyltin dilaurate, tin dioctoate and/or dibutyldilauryltin mercaptide. In additional to the catalysts of the invention further catalysts can be used, eg amidines, such as 2,3-dimethyl-3,4,5,6-tetrahydropyrimidine, tetraalkylammonium hydroxides such as tetramethylammonium hydroxide, alkali metal hydroxides such as sodium hydroxide and alkali metal alkoxides such as sodium methoxide and potassium isopropylate and also alkali metal salts of long-chain fatty acids containing from 10 to 20 carbon atoms and optionally pendant hydroxyl groups.

Optionally, further auxiliaries and/or additives can be incorporated in the reaction mixture for the preparation of the polyurethane foams. Specific examples thereof are surfactants, foam stabilizers, cell regulators, fillers, colorants, pigments, flame retardants, antihydrolysis agents and fungistatically and bacteriostatically effective substances. Examples of suitable surfactants are compounds which serve to assist homogenization of the starting materials and are optionally also suitable for controlling the cellular structure of the plastic material. Specific examples are emulsifiers such as the sodium salts of sulfated castor oil or of fatty acids and also salts of fatty acids with amines, eg diethylamine oleate, diethanolamine stearate, diethanolamine ricinoleate, salts of sulfonic acids, eg alkali metal or ammonium salts of dodecylbenzenedisulfonic or dinaphthylmethanedisulfonic acid and ricinoleic acid; foam stabilizers, such as poly(siloxane-co-alkoxylene)s and other organopolysiloxanes, ethoxylated alkylphenols, ethoxylated fatty alcohols, paraffin oils, ricinoleates, Turkey-red oil and peanut oil and cell regulators such as alkanes, fatty alcohols and dimethylpolysiloxanes. The aforementioned oligomeric acrylates containing polyoxyalkylene radicals and fluoroalkane radicals as side-groups are also suitable for effecting improvement of the emulsifying action, the cellular structure and/or stability of the foam. By fillers, particularly reinforcing fillers, there are meant the known conventional organic and inorganic fillers, reinforcing agents, weighting agents and antiscuffing agents for paints, coating compositions etc. The following may be mentioned as specific examples: inorganic fillers such as siliceous minerals, eg lamellar silicates such as antigorite, serpentine, hornblendes, amphiboles, chrisotile and talcum powder, metal oxides such as kaolin, aluminum oxides, titanium oxides and iron oxides, metal salts such as chalk, heavy spar and inorganic pigments such as cadmium sulfide and zinc sulfide and also glass and the like. It is preferred to use kaolin (China Clay), aluminum silicate and co-precipitates of barium sulphate and aluminum silicate and also natural and synthetic fibrous minerals such as wollastonite, metallic fibers and, in particular glass fibers, of various lengths, which may be optionally sized. Examples of suitable organic fillers are coal, melamine, colophony, cyclopentadienyl resins and graft polymers and also cellulose fibers, polyamide, polyacrylonitrile, polyurethane and polyester fibers on the basis of aromatic and/or aliphatic dicarboxylates and particularly carbon fibers. The inorganic and organic fillers can be used individually or in the form of mixtures and are incorporated in the reaction mixture advantageously in amounts of from 0.5 to 50 wt % and preferably from 1 to 40 wt % based on the weight of isocyanates and the weight of all of the isocyanate-reactive compounds used, where the content of mats, non-wovens and fabrics composed of natural and synthetic fibers may however acquire values of up to 80 wt %. Examples of suitable flame retardants are tricresyl phosphate, tris(2-chloroethyl) phosphate, tris-(2-chloropropyl) phosphate, tris(1,3-dichloropropyl) phosphate, tris(2,3-dibromopropyl) phosphate, tetrakis(2-chloroethyl)ethylene diphosphate, dimethylmethane phosphonate, ethyl diethanolaminomethylphosphonate and also commercial halogen-containing flame-protecting polyalcohols. Not only the aforementioned halogen-substituted phosphates but also inorganic or organic flame retardants such as red phosphorus, hydrous aluminium oxide, antimony trioxide, arsenic oxide, ammonium polyphosphate and calcium sulfate, exfoliated graphite or cyanuric derivatives such as melamine or mixtures of at least two flame retardants such as ammonium polyphosphates and melamine and also optionally maize starch or ammonium polyphosphate, melamine and exfoliated graphite and/or optionally aromatic polyesters can be used for flameproofing the polyisocyanate polyaddition products. Generally, it has been found to be advantageous to use from 5 to 50 wt % and preferably from 5 to 25 wt % of the specified flame retardants based on the weight of all of the isocyanate-reactive compounds used.

For the preparation of the polyurethane foams of the invention, isocyanates, components (ii) and (iii) and also optionally chain-extending and/or crosslinking agents having a molecular weight of less than 400 are caused to react in proportions such that the equivalent ratio of NCO groups of isocyanates to the sum of the reactive hydrogen atoms of the mixture and, optionally, of the chain-extending and/or crosslinking agents is from 0.85:1 to 1.25:1, preferably from 0.95:1 to 1.15:1 and more preferably from 1:1 to 1.05:1. If the rigid polyurethane foams contain at least some bonded isocyanurate groups, a ratio of NCO groups to the sum of the reactive hydrogen atoms of from 1.5:1 to 60:1 and preferably from 1.5:1 to 8:1 is usually used.

The polyurethane foams are advantageously prepared by a one-shot process, utilizing, for example, high-pressure or low-pressure engineering in open or sealed molds, eg metallic molds. The continuous feed of the reaction mixture to suitable belt conveyor means for the production of panels is also commonly used.

It has been found to be particularly advantageous to operate using a two-component process and to combine the components (ii) and (iii), the expanding agent(s), the catalysts and optionally the chain-extending and/or crosslinking agents and auxiliaries and/or additives in component (A) and to use isocyanates or mixtures of isocyanates and optionally expanding agents as component (B).

The starting components are mixed, depending on the application, at a temperature of from 0° to 100° C. and preferably from 20° to 60° C. and introduced into an open mold or, if operating at elevated pressure, a sealed mold, or are fed, when operating continuously, to a conveyer belt adapted to accept the reaction mixture. The mixing can, as explained above, be carried out mechanically by means of a stirrer or a paddle screw. The reaction temperature in the mold, ie the temperature at which the reaction takes place, is preferably from 25° to 35° C.

The process of the invention is suitable, depending on the stock used, for the preparation of all conventional polyurethane foams, particularly rigid and flexible polyurethane foams.

The flexible polyurethane foams that are produced by the process of the invention usually have a density of from 15 to 100 kg/m$^3$ and are preferably used in the furniture and motor car industries, more preferably as upholstery material.

The process of the invention preferably produces flexible polyurethane foams conforming to DIN 7726. These foamed plastics very preferably have a compressive strength, as specified in DIN 53477, of less than 20 kPas.

The invention is illustrated below with reference to the following examples.

The tables list the reaction mixtures used in the examples, the figures referring to the components polyalcohol(s), water, catalyst(s) and stabilizer(s) denoting the quantity of the components polyalcohol(s), water, catalyst(s) and stabilizer(s) present in the respective component A, in grams.

In each case, 100 g of component A listed in Tables 1 and 2 containing polyalcohol(s), water, catalyst(s) and stabilizer(s) were mixed with the stated quantity of isocyanate by means of a laboratory stirrer in a 500 mL beaker, filled into a 1000 mL beaker and allowed to react.

The reaction parameters such as temperature, starting time, setting time and rising time and also the density and an evaluation of the foams prepared are likewise given in the tables.

TABLE 1

| Example | 1 | 2 | 3 |
|---|---|---|---|
| Polyalcohol 1 [g] | — | — | 45 |
| Polyalcohol 2 [g] | — | — | — |
| Polyalcohol 3 [g] | — | — | 28 |
| Polyalcohol 4 [g] | 90 | — | — |
| Polyalcohol 5 [g] | — | 75 | — |
| Polyalcohol 6 [g] | — | — | — |
| Polyalcohol 7 [g] | — | — | 3 |
| Diethanolamine [g] | — | 10 | 10 |
| N,N—Dimethylpropylenediamine [g] | — | 5 | 5 |
| Water [g] | 2 | 2 | 3.5 |
| Catalyst 1 [g] | — | — | 0.2 |
| Catalyst 2 [g] | 2 | 1.5 | — |
| Catalyst 3 [g] | — | — | — |
| Catalyst 4 [g] | 6 | 4 | 0.3 |
| Stabilizer 1 [g] | 0.5 | 0.5 | — |
| Stabilizer 2 [g] | 0.5 | 0.5 | — |
| Stabilizer 3 [g] | — | — | 1 |
| Dicloromethane [g] | — | — | 15 |
| NCO 1 [g] | 168 | 168 | — |
| NCO 2 [g] | — | — | 85 |
| NCO 3 [g] | — | — | — |
| T [° C.] | 25 | 25 | 25 |
| $t_{start}$ [s] | 44 | 35 | 11 |
| $t_{set}$ [s] | 170 | 120 | — |
| $t_{exp}$ [s] | 210 | 155 | 120 |
| Density [g/l] | — | 64 | 33 |
| Assessment of foam | no foam could be produced | fine foam | medium foam |

TABLE 2

| Example | 4 | 5 | 6 | 7 |
|---|---|---|---|---|
| Polyalcohol 1 [g] | 44 | 52 | 44 | 44 |
| Polyalcohol 2 [g] | — | — | — | — |
| Polyalcohol 3 [g] | 27 | 27 | 27 | 27 |
| Polyalcohol 4 [g] | — | — | — | — |
| Polyalcohol 5 [g] | — | — | — | — |
| Polyalcohol 6 [g] | 5 | 15 | 5 | 15 |
| Polyalcohol 7 [g] | — | — | — | — |
| Diethanol-amin [g] | 9 | — | 9 | 9 |
| N,N—Dimethylpropylene-diamine [g] | 9 | — | 9 | 9 |
| Water [g] | 3.7 | 3.7 | 6 | 3.7 |
| Catalyst 1 [g] | 0.2 | 0.3 | 0.2 | 0.2 |
| Catalyst 2 [g] | — | — | — | — |
| Catalyst 3 [g] | — | — | — | — |
| Catalyst 4 [g] | 0.3 | 0.3 | — | 0.3 |
| Stabilizer 1 [g] | — | — | — | — |
| Stabilizer 2 [g] | — | — | — | — |
| Stabilizer 3 [g] | 1.5 | 1.5 | 1.5 | 1 |
| Dicloromethane [g] | 15 | 15 | — | 15 |
| NCO 1 [g] | — | — | — | — |
| NCO 2 [g] | 85 | 89 | 85 | — |
| NCO 3 [g] | — | — | — | 90 |
| T [° C.] | 25 | 25 | 25 | 25 |
| $t_{start}$ [s] | 14 | 66 | 11 | 18 |
| $t_{set}$ [s] | — | 120 | — | — |
| $t_{exp}$ [s] | 120 | 220 | 120 | 125 |
| Density [g/l] | 31 | — | 78 | 35 |
| Assessment of foam | fine foam | no foam could be produced | coarse foam | fine foam |

| | |
|---|---|
| Polyalcohol 1: | polyetherol based on glycerol, alkoxylated with propylene oxide and stopped with ethylene oxide, hydroxyl value 55 mg KOH/g; |
| Polyalcohol 2: | polyetherol based on glycerol and propylene oxide, hydroxyl value 55 mg KOH/g; |
| Polyalcohol 3: | graft polyalcohol, hydroxyl value 25, solids content 30% (Lupranol ® 4100, BASF Aktiengesellschaft) |
| Polyalcohol 4: | polyetherol based on sucrose, glycerol, water and propylene oxide, hydroxyl value 490 mg KOH/g; |
| Polyalcohol 5: | polyetherol based on sucrose, glycerol and water, alkoxylated with propylene oxide and stopped with ethylene oxide, hydroxyl value 490 mg KOH/g; |
| Polyalcohol 6: | polyetherol based on glycerol, alkoxylated with propylene oxide and stopped with ethylene oxide, hydroxyl value 550 mg KOH/g; |
| Polyalcohol 7: | polyetherol based on trimethylol propane, alkoxylated with ethylene oxide, hydroxyl value 940 mg KOH/g; |
| Catalyst 1: | tin catalyst (Lupragen ® D22, BASF Aktiengesellschaft); |
| Catalyst 2: | tin catalyst (Formrez UL 32, sold by Witco); |
| Catalyst 3: | tertiary amine (Lupragen ® N301, BASF Aktiengesellschaft); |
| Catalyst 4: | tertiary amine (Lupragen ® N206, BASF Aktiengesellschaft); |
| Stabilizer 1: | foam stabilizer based on silicone (B 8404, sold by Goldschmidt); |
| Stabilizer 2: | foam stabilizer based on silicone (B 8919, Goldschmidt); |
| Stabilizer 3: | foam stabilizer based on silicone (B 8870, Goldschmidt); |
| NCO 1: | biuretized hexamethylene diisocyanate (Basonat ® HB 100, BASF Aktiengesellschaft); |
| NCO 2: | isocyanurated hexamethylene diisocyanate (Basonat ® HI 100, BASF Aktiengesellschaft); |
| NCO 3: | lysine methylester diisocyanate trimerized to the isocyanurate; |
| T [° C.]: | temperature of the reaction mixture during reaction thereof; |
| $t_{start}$: | starting time [s]; |
| $t_{set}$: | setting time [s]; |
| $t_{exp}$: | expanding time [s]. |

In the comparative examples 1 and 5 no compounds exhibiting primary amine groups were used. Neither was any component used in Example 1 (ii) which exhibited at least 50% of primary hydroxyl groups.

The examples 2, 3, 4, 6 and 7 are examples of the invention.

No foams of high quality could be prepared in these comparative examples. Either the foams produced were too coarse or they collapsed.

The foamed plastics manufactured by the process of the invention show excellent reaction parameters. The foamed plastics prepared are found to be fast to light and are highly suitable for the preparation of upholstery foams.

We claim:

1. A process for the preparation of a foamed plastic material based on polyisocyanate polyaddition products comprising reacting isocyanates with isocyanate-reactive compounds in the presence of catalysts and, optionally, auxiliaries and/or additives, wherein
   i) said isocyanates contain isocyanurate and/or biuret structures, and said isocyanate-reactive compounds comprise
   ii) at least one diol and/or polyol having a molecular weight of from 400 to 8000 and containing at least 50% of primary hydroxyl groups based on all of the hydroxyl groups present in the compound, iii) at least one compound having at least one primary amine group, and, optionally, as further components, diols and/or triols having molecular weights of less than 400, acting as chain-extending and/or crosslinking agents, wherein the reaction is carried out in the presence of iv) at least one tertiary amine acting as catalyst and/or v) at least one metal salt acting as catalyst and vi) water.

2. A process as defined in claim 1, wherein the isocyanates comprise isocyanuratized and/or biuretized hexamethylene-1,6-diisocyanate, 1-isocyanato-3,3,5-trimethyl-5-isocyanatomethylcyclohexane and/or lysine ester diisocyanate.

3. A process as defined in claim 1, wherein the isocyanate-reactive compounds comprise a polyether polyalcohol.

4. A process as defined in claim 1, wherein the tertiary amine comprises triethylene diamine, pentamethylenediethylene triamine and/or bis(dimethylamino)ether and the metal salt comprises dibutyltin dilaurate, tin dioctoate and/or dibutyldilauryltin mercaptide.

5. A process as defined in claim 1, wherein the total amount of hydroxyl group-containing compounds having a molecular weight of from 400 to 8000 used shows on average at least 50% of primary hydroxyl groups, based on all of the hydroxyl groups present in these compounds.

6. A process as defined in claim 1, wherein the nitrogen content in components (ii), (iii) and the optional diols or triols having molecular weights of less than 400 is from 2 to 7 weight percent, based on the weight of components (ii), (iii) and the optional diols and/or triols having molecular weights of less than 400.

7. A process as defined in claim 1, wherein the reaction is carried out in the presence of from 3 to 15 wt %, based on the weight of isocyanate-reactive compounds, of a physically active expanding agent.

8. A foamed plastics material based on polyisocyanate polyaddition products, produced by a process as defined in claim 1.

* * * * *